United States Patent [19]
Chaudhry

[11] Patent Number: 5,623,388
[45] Date of Patent: Apr. 22, 1997

[54] OVERVOLTAGE PROTECTION CIRCUITS

[75] Inventor: Nisar Chaudhry, West Babylon, N.J.

[73] Assignee: Tii Industries, Inc., Copiague, N.Y.

[21] Appl. No.: 649,285

[22] Filed: May 17, 1996

Related U.S. Application Data

[63] Continuation of Ser. No. 438,448, May 10, 1995, abandoned, which is a continuation of Ser. No. 23,551, Feb. 26, 1993, abandoned.

[51] Int. Cl.⁶ .................................................. H02H 1/04
[52] U.S. Cl. ........................... 361/119; 361/56; 361/111; 361/126
[58] Field of Search ............................... 361/56, 58, 111, 361/112, 117–120, 126, 127

[56] References Cited

U.S. PATENT DOCUMENTS 4,156,838   5/1979   Montague ........................... 361/118
4,941,063   7/1990   McCartney et al. .................. 361/119

FOREIGN PATENT DOCUMENTS 186873   7/1986   European Pat. Off. ......... H02H 9/04

*Primary Examiner*—Jeffrey A. Gaffin
*Assistant Examiner*—Ronald W. Leja
*Attorney, Agent, or Firm*—Martin Sachs

[57] ABSTRACT

A miniature solid state overvoltage protection circuit for use on telephone lines using a solid state circuit arrangement connected between the tip terminal and the ground terminal and another solid state circuit between the ring terminal and the ground terminal. The first current path includes a bi-directional solid state thyristor having two terminals. One terminal of the thyristor is connected to the tip terminal and the other terminal is connected in series with a parallel pair of oppositely polarized semiconductor diodes connected to the ground terminal. A second current path is disposed between the ring terminal and the ground terminal and is identical to the first current path.

6 Claims, 2 Drawing Sheets

OVERVOLTAGE PROTECTION CIRCUITS

The present application is a Continuation of application Ser. No. 08/438,448 filed May 10, 1995, by the applicant Nisar Chaudhry, now abandoned, which was a Continuation of application Ser. No. 08/023,551, filed Feb. 26, 1993, by the same applicant, now abandoned.

BACKGROUND OF THE INVENTION

1. Field of the Invention

The present invention generally relates to overvoltage protection circuits, and more particularly to voltage surge protection circuitry which protects equipment connected to communication lines when they are hit by lightning.

2. Discussion of the Relevant Art

Many circuit arrangements have been developed over the years to protect communications and other equipment from being destroyed when lightning strikes, which causes tremendous overvoltage surges on the communication transmission lines. Equipment connected to the communication lines are not designed to withstand these high voltage surges and, in order to protect them, it is necessary to provide very rapid overvoltage protection circuitry that does not dissipate significant amounts of power. Moreover, the protection circuit is not to be activated or tripped when the ringer voltage of 120 volts is applied to the line. In addition, the electrostatic capacitance should be no higher than 200 pico farads (pf), since the transmission loss standards specify that the signal line impedance with respect to ground should be greater than 4,000 ohms to enable the maximum frequency component of the transmitted signal to be carried with a limited dissipation assuming a digital transmission speed of 200 kb per second. The protection circuit should also be capable of handling a lightning surge currents in excess of 100 Ampere with current wave rising to a peek value in ten microseconds and exponentially falling to one-half the peek current value in 1,000 microseconds. Thus, in addition to clamping the voltage on the transmission or communication lines to a safe value it is also necessary that the protection circuit absorb large amounts of current for short periods of time. The need to carry large currents requires that the semiconductor device has a relatively large surface area, which generally increases the amount of capacitance that the device has. Placing increased capacity across the communication line prohibits the higher frequency components of the communication systems to be limited.

The patent to Satoh, et al. utilizes a thyristor, triac, and silicon symmetrical switch (SSS) connected in series with a voltage limited bi-directional zener or thyristor, varistor, metal oxide varistor (MOV) or a Transorb unit connected in series from one side of the line to ground. However, the bi-directional zener, although generally fast operating, provides capacitance across the line which is greater than desired.

The present invention overcomes the short comings of the prior art by providing a circuit arrangement that reduces capacitance loading on the communication line. The breakover voltage is determined by the thyristor device and not the series diodes. The insulation resistance of the circuit arrangement increases with the use of the diodes and the leakage current through the combination decreases. The response time is not altered by using the series diodes and the overshoot with fast rising transients are virtually non existent.

Therefore, it is an object of the present invention to provide an improved overvoltage protection circuit.

It is a further object of the present invention to provide an improved overvoltage protection circuit which has a short response time.

Still another object of the present invention is to provide a solid state protector circuit which has fewer components and which may be used on high frequency transmission systems.

Yet another object of the present invention is to provide a circuit arrangement which utilizes relatively inexpensive circuit components.

SUMMARY OF THE INVENTION

The present invention overcomes the shortcomings of the prior art by providing, according to the principles of the present invention, a miniature overvoltage protection circuit which may be used with or without a gas tube to protect communication equipment and includes a first current path disposed between the tip terminal and the ground terminal of a communication system. The first current path includes a first solid state bi-directional thyristor device having two terminals. One terminal of the thyristor device is connected to the tip terminal and the other terminal of the first thyristor device is connected in series with a parallel pair of oppositely polarized semiconductor diodes which are connected in parallel to the ground terminal. A second current path disposed between the ring terminal and the ground terminal is identical with the first current path.

The foregoing and other objects and advantages will appear from the description to follow. In the description references made to the accompanying drawings which form a part hereof, and which is shown by illustration, specific embodiments in which the invention may be practiced. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

DESCRIPTION OF THE DRAWINGS

The subject matter which I regard as my invention is particularly pointed out and distinctly claimed at the concluding portion of the specification. My invention, itself, however both as to its organization and method of operation, together with further objects and advantages thereof may best be understood by reference of the following description taken in connection with the accompanying drawing wherein like reference characters refer to like components.

DESCRIPTION OF THE PREFERRED EMBODIMENT

Figure 1:
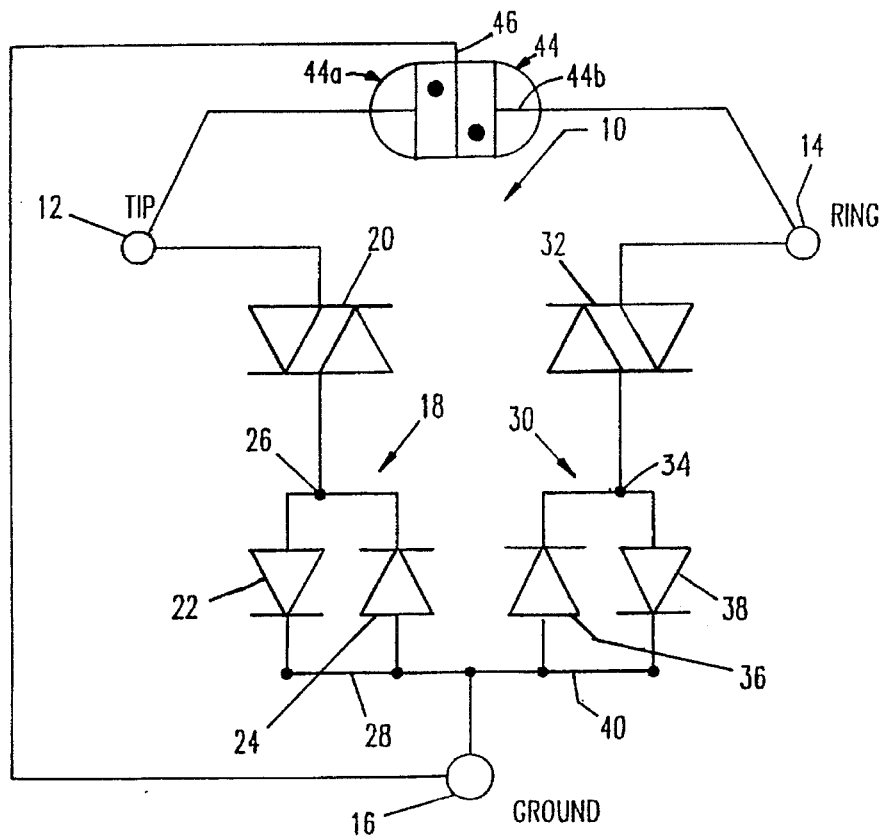
FIG. 1 is a schematic circuit diagram, according to the principles of the present invention, showing one embodiment connected across the tip and ring terminals to a ground terminal of a conventional telephone communication line.

Referring now to the figures and in particular to FIG. 1, there is shown an overvoltage protection circuit 10 which is connected across the tip terminal 12, ring terminal 14 and the ground terminal 16 of a conventional telephone communication line, not shown. A first series current path 18 is formed from the tip terminal 12 to ground terminal 16, which includes a bi-directional thyristor device connected to a parallel pair of oppositely polarized diodes 22 and 24 connected with one juncture 26 thereof connected to the thyristor and the other juncture 28 of the parallel pair of oppositely polarized diodes 22 and 24 being connected to the ground terminal 16.

A second series current path 30 between the ring terminal 14 and the ground terminal 16 includes thyristor 32 connected to the juncture 34 of the parallel pair of oppositely polarized diodes 36 and 38 connected with the juncture 34 thereof connected to the thyristor 32 and the other juncture 40 of the diodes 36 and 38 connected to the ground terminal 16.

Figure 2:
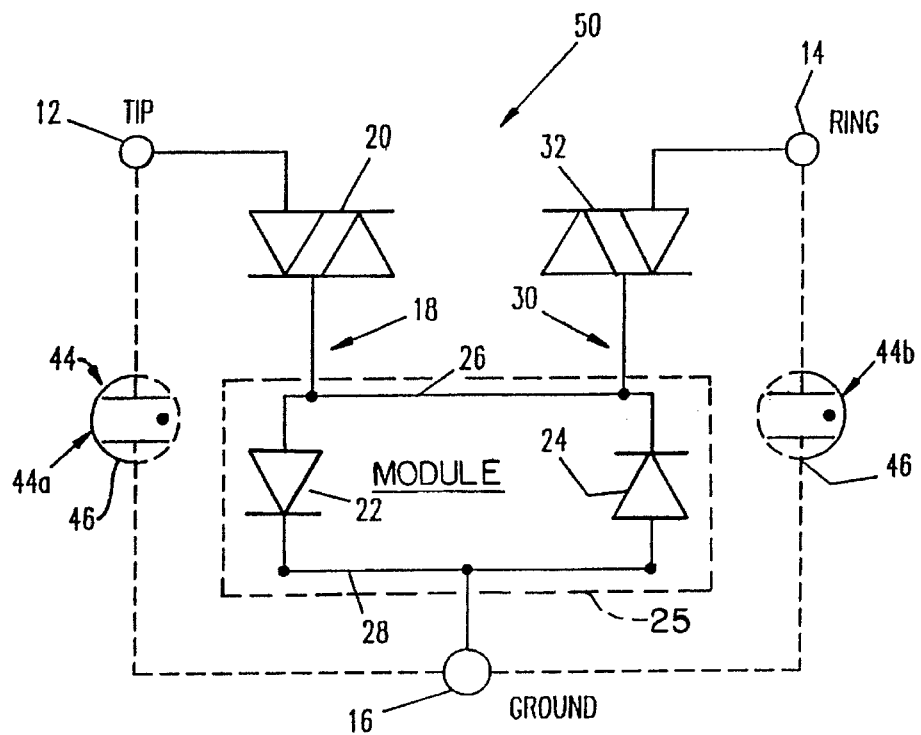
FIG. 2 is a schematic circuit diagram of an alternative embodiment of the preferred circuit arrangement connected across the tip and ring terminals to a ground terminal of a telephone communication line.

In FIG. 2 a gas tube 44 is of the three terminal type having a ground terminal 46 and two independent gas filled portions 44a and 44b which is connected across the communication lines. Gas tube portion 44a is connected from terminal 12 (tip) to the ground terminal 16. Gas tube portion 44b is connected from terminal 14 (ring) to the ground terminal 16.

The gas tube may be purchased from TII Industries, Incorporated as a TII 31b, which has a break-over at 3 KV per microsecond of 524 volts, and at 10 KV per microsecond a break-over is 606 volts; or the TII 11b, which has a break-over at 3 KV per microsecond of 582 volts and a break-over at 10 KV per microsecond of 626 volts.

It has been noted that the current through the gas tubes 44a and 44b does not depend upon the voltage across it, once the tube is broken down it will be limited by the source impedance.

The circuit as shown in FIG. 1 or FIG. 2 may be utilized with or without the gas tube 44 (44a and 44b).

Referring now to FIG. 2 there is shown an alternate embodiment of the overvoltage protection circuit 50, which includes a first current path 18 between the tip terminal 12 and the ground terminal 16 that includes thyristor 20 connected in series with diodes 22 and 24, which are parallel pair of oppositely polarized diodes connected in parallel with their juncture 26 being connected to the thyristor 20 and the other juncture 28 thereof being connected to the ground terminal 16.

A second current path is provided between the ring terminal 14 and the ground terminal, 16 which includes thyristor 32 connected in series with the parallel pair of oppositely polarized diodes 22 and 24, connected in parallel, with one juncture 26 thereof connected to the thyristor 32 and the other juncture 28 of diodes 22 and 24 connected the to ground terminal 16.

Typically the break-down voltage of the thyristor, when measured with the diodes in series, has essentially no change and thus does not affect the operation of the thyristor. The capacity across the tip to ground or ring to ground however, changes markedly with the use of the conventional diodes placed in series with the thyristor and thus the capacity of the thyristor, which runs in excess of 300 pico farads plus or minus 10%, is reduced to approximately 100 pico farads plus or minus 10% or ⅓ the capacity of the thyristor alone.

Figure 3:
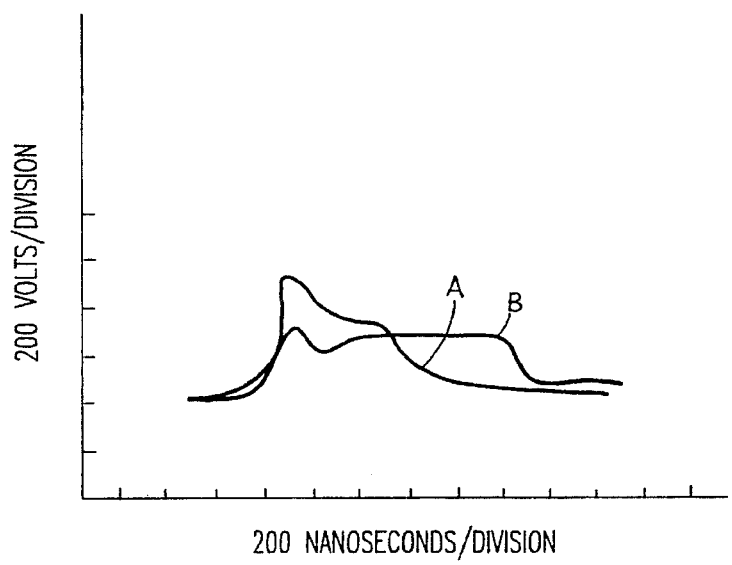
FIG. 3 is a graph showing voltage versus time for the circuit arrangement shown in FIG. 1, using only a gas tube, when surged with (A) a 10 KV per microsecond voltage and (B) a 100 V per microsecond voltage.

Referring now to FIG. 3, which is a graphic illustration of a gas tube alone when surged with (A) a 10 KV and (B) a 100 volt per microsecond pulse. The peak breakdown voltage is 650 volts for curve (A) and 330 volts for curve (B).

Figure 4:
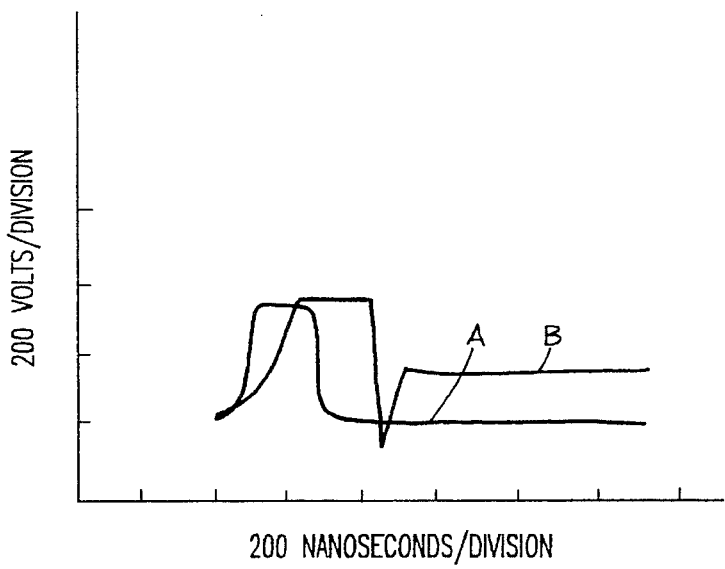
FIG. 4 is a graph of voltage versus time similar to FIG. 3 of the circuit arrangement of FIG. 1 with two oppositely polarized diodes connected in parallel and placed in series with the bi-directional thyristor connected between the tip and ring terminals and the ground terminal with curve (A) surged with a 10 KV per microsecond pulse and (B) surged with a 3 KV per microsecond pulse.

Referring now to FIG. 4, which is a graphic representation of a thyristor connected in series with the parallel pair of oppositely polarized diodes with a gas tube in parallel therewith when it is surged with 10 KV (A) and 3 KV (B) per microsecond pulse wherein the breakdown voltage is approximately 350 volts.

Figure 5:
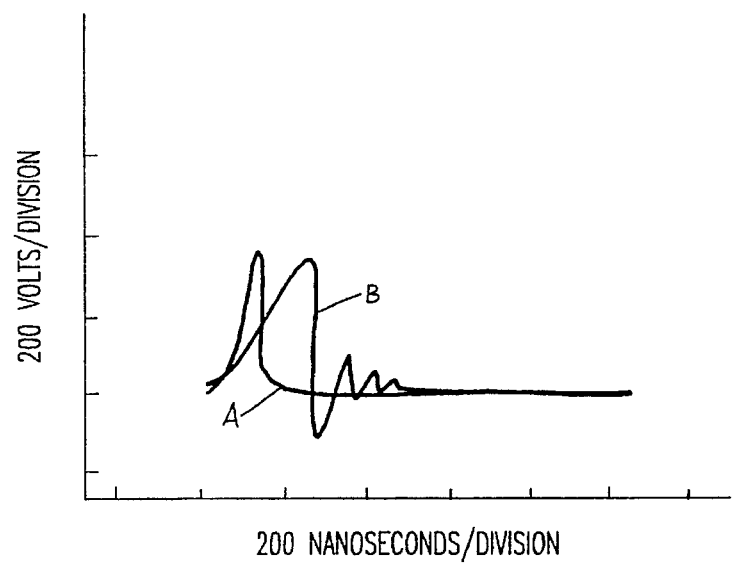
FIG. 5 is a graph of voltage versus time for the same circuit arrangement of FIG. 1 when surged with (a) a 10 KV per microsecond rate of rise voltage and (B) surged with a 3 KV per microsecond rate of rise voltage with a gas tube in parallel therewith.

Referring now to FIG. 5, which is a graphic representation of a gas tube in parallel with the circuit arrangement shown in FIG. 1 when it is pulsed with (A) a 10 KV and (B) a 3 KV per microsecond pulse.

Hereinbefore, has been disclosed the circuit arrangement for an overvoltage protection circuit which is inexpensive to manufacture, is reduced in size and is reliable. It will be understood that various changes in the details, materials, arrangement of parts and operating conditions which have been herein described and illustrated in order to explain the nature of the invention may be made by those skilled in the art within the principles and scope of the instant invention.

Having thus set forth the nature of the invention what is claimed is:

1. A miniature overvoltage protection circuit for use on telephone lines having tip, ring and ground terminals, consisting of:

a) a first current path disposed between said tip terminal and said ground terminal, said first current path including a first solid state bi-directional thyristor device having two terminals, one terminal of said first thyristor device being connected to said tip terminal and the other terminal of said first thyristor device being connected in series with a parallel pair of oppositely polarized semiconductor diodes, which are connected to said ground terminal in order to reduce capacitance loading on the telephone lines; and b) a second current path disposed between said ring terminal and said ground terminal identical with said first current path.

2. A miniature back-up overvoltage protection circuit for use on telephone lines having tip, ring and ground terminals, consisting of:

a) a first current path disposed between said tip terminal and said ground terminal, said first current path including a first solid state bi-directional thyristor device having two terminals, one terminal of said thyristor device being connected to said tip terminal and the other terminal of said thyristor device being connected in series with a parallel pair of oppositely polarized semiconductor diodes, which are connected to said ground terminal in order to reduce capacitance loading on the telephone lines; and b) a second current path disposed between said ring terminal and said ground terminal, said second current path including a second solid state bi-directional thyristor device having two terminals, one terminal of said second thyristor device being connected to said ring terminal and the other terminal of said second thyristor device being connected to the juncture of said parallel pair of oppositely polarized semiconductor diodes and said other terminal of said first thyristor device.

3. A miniature back-up overvoltage protection circuit according to claims 1 or 2, wherein each said parallel pair of oppositely polarized semiconductor diodes are provided in a single unitary module.

4. A miniature overvoltage protection circuit for use on telephone lines having tip, ring and ground terminals, consisting of:

a) a gas tube having a first, a second and a third terminal, said first terminal being connected to said tip terminal, said third terminal being connected to said ground terminal, and said second terminal being connected to said ring terminal;

b) a first current path disposed between said tip terminal and said ground terminal, said first current path including a first solid state bi-directional thyristor device having two terminals, one terminal of said first thyristor device being connected to said tip terminal and the other terminal of said first thyristor device being connected in series with a parallel pair of oppositely polarized semiconductor diodes, which are connected to said ground terminal in order to reduce capacitance loading on the telephone lines; and c) a second current path disposed between said ring terminal and said ground terminal being identical with said first current path.

5. A miniature overvoltage protection circuit for use on telephone lines having tip, ring and ground terminals, consisting of:

a) a gas tube having a first, a second and a third terminal, said first terminal being connected to said tip terminal, said second terminal being connected to said ring terminal and said third terminal being connected to said ground terminal;

b) a first current path disposed between said tip terminal and said ground terminal, said first current path including a first solid state bi-directional thyristor device having two terminals, one terminal of said thyristor device being connected to said tip terminal and the other terminal of said thyristor device being connected in series with a parallel pair of oppositely polarized semiconductor diodes, which are connected to said ground terminal in order to reduce capacitance loading on the telephone lines; and c) a second current path disposed between said ring terminal and said ground terminal, said second current path including a second solid state bi-directional thyristor device having two terminals, one terminal of said second thyristor device being connected to said ring terminal and the other terminal of said second thyristor device being connected to the juncture of said parallel pair of oppositely polarized semiconductor diodes and said other terminal of said first thyristor device.

6. A miniature overvoltage protection circuit according to claims 4 or 5, wherein each said parallel pair of oppositely polarized semiconductor diodes are provided in a single unitary module.

\* \* \* \* \*